United States Patent [19]

Ledbetter

[11] 4,407,074
[45] Oct. 4, 1983

[54] APPARATUS FOR CUTTING AND/OR SCRIBING CIRCLES AND OVALS

[76] Inventor: Buford B. Ledbetter, 1312 Southern Pky., Clarksville, Tenn. 37040

[21] Appl. No.: 163,861

[22] Filed: Jun. 27, 1980

[51] Int. Cl.³ .............................................. B43L 11/02
[52] U.S. Cl. ................................. 33/27 H; 33/27 G; 33/30 G
[58] Field of Search .............................. 33/27, 30, 31

[56] References Cited

U.S. PATENT DOCUMENTS

| | | | |
|---|---|---|---|
| 1,126,252 | 1/1915 | Moritz | 33/27 L |
| 2,343,035 | 2/1944 | Weihs | 33/27 G |
| 2,469,112 | 5/1949 | Helwig | 33/27 G |

Primary Examiner—Harry N. Haroian

[57] ABSTRACT

A horizontal rotary table is provided and a mounting arm is supported above the table and generally parallels the latter. The arm extends along a path paralleling an axis of rotation of the table and an upright shaft is journalled from the mounting arm for rotation about an upright axis coinciding with the axis of rotation of the table. Drive structure drivingly connects the table and the upright shaft for rotation of the latter at twice the speed of rotation of the table and a support is mounted on the support arm for guided movement therealong. A scribe tool is carried by the support for engagement with and scribing a workpiece disposed on the table for rotation with the latter and motion converting and drive structure is operatively connected between the upright shaft and the support for effecting oscillation of the support along the arm responsive to and an in timed relation with rotation of the shaft. The motion converting and drive structure includes operational features which function to continuously vary the linear displacement rate of the support along the arm during constant angular velocity of the upright shaft.

9 Claims, 8 Drawing Figures

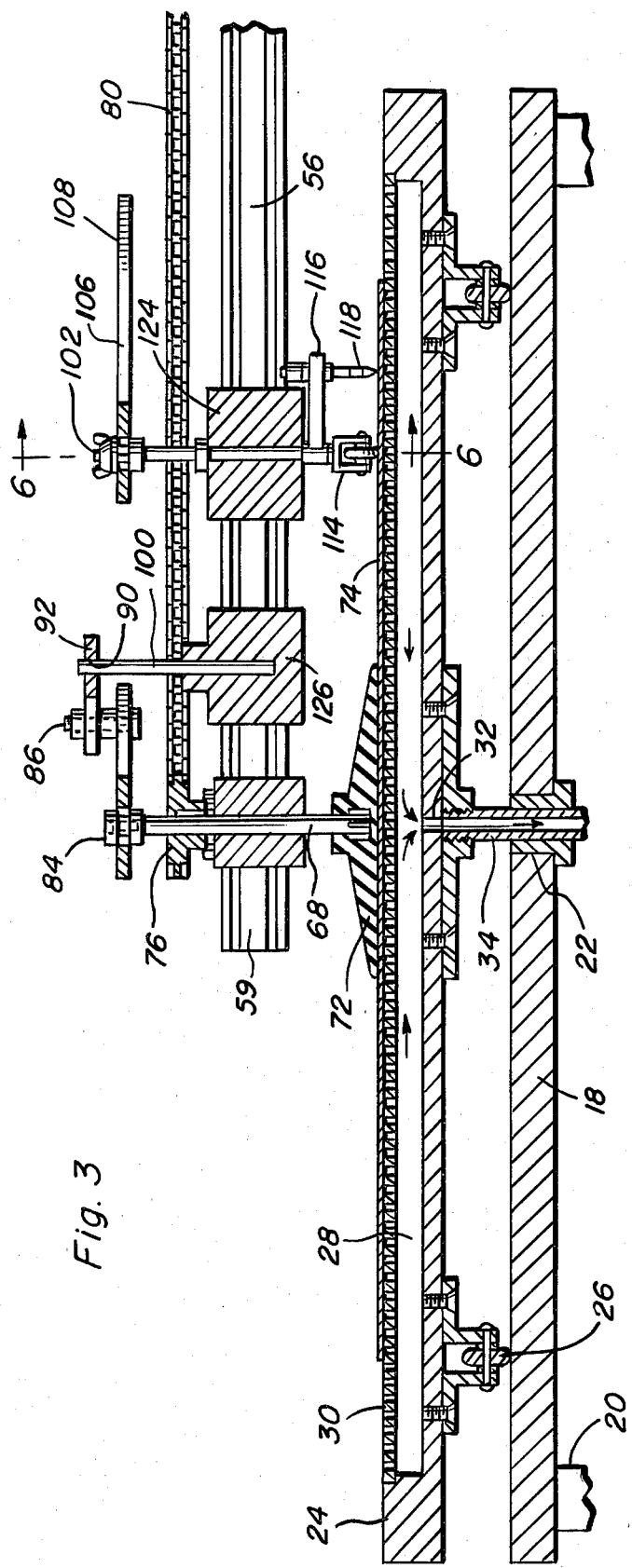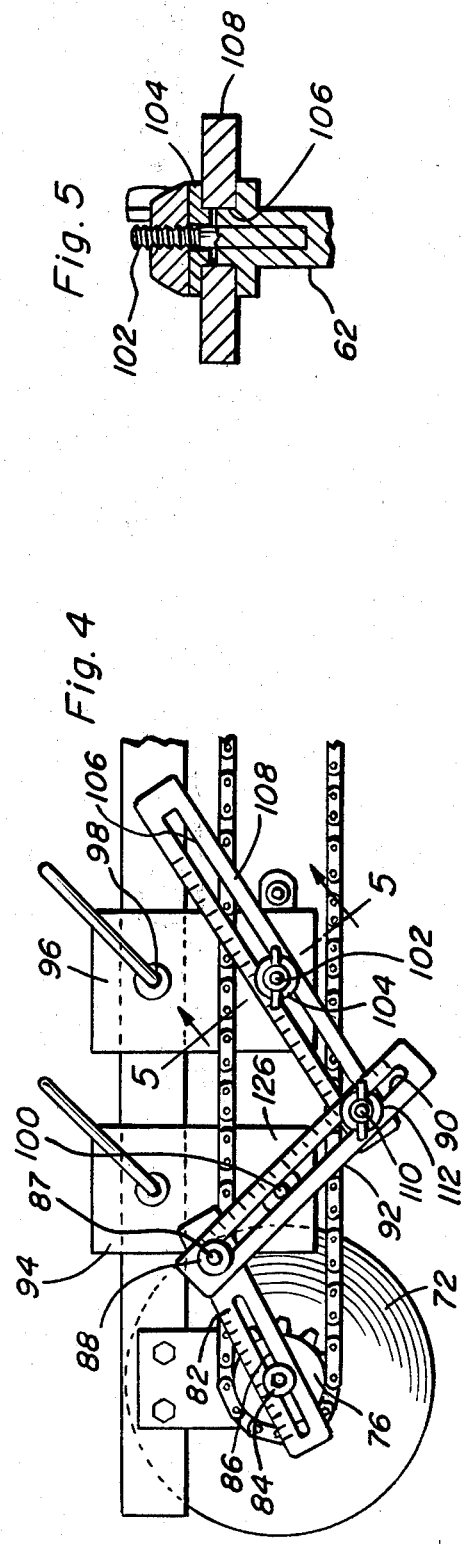

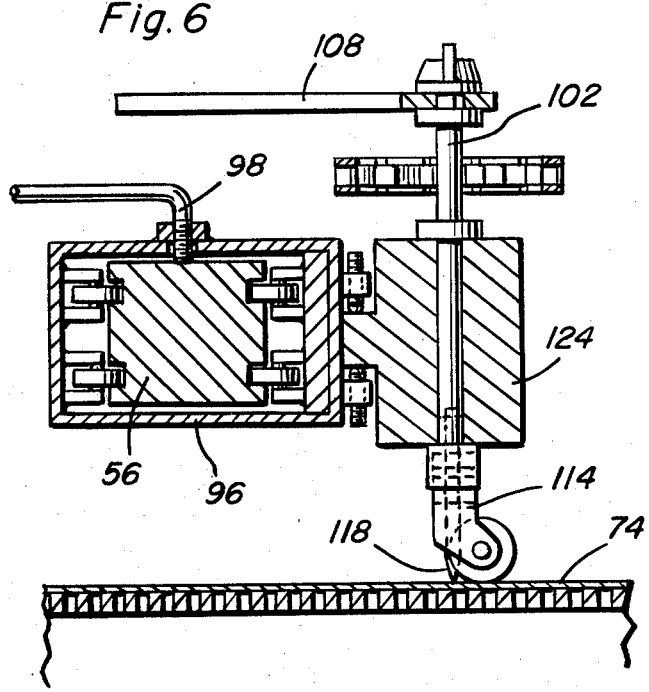
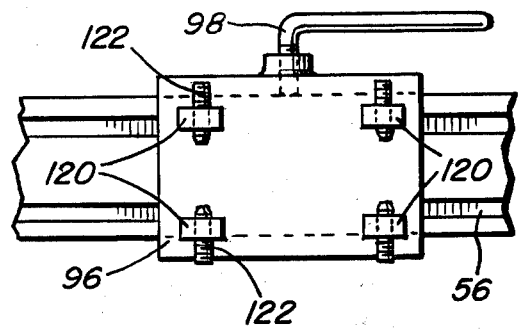
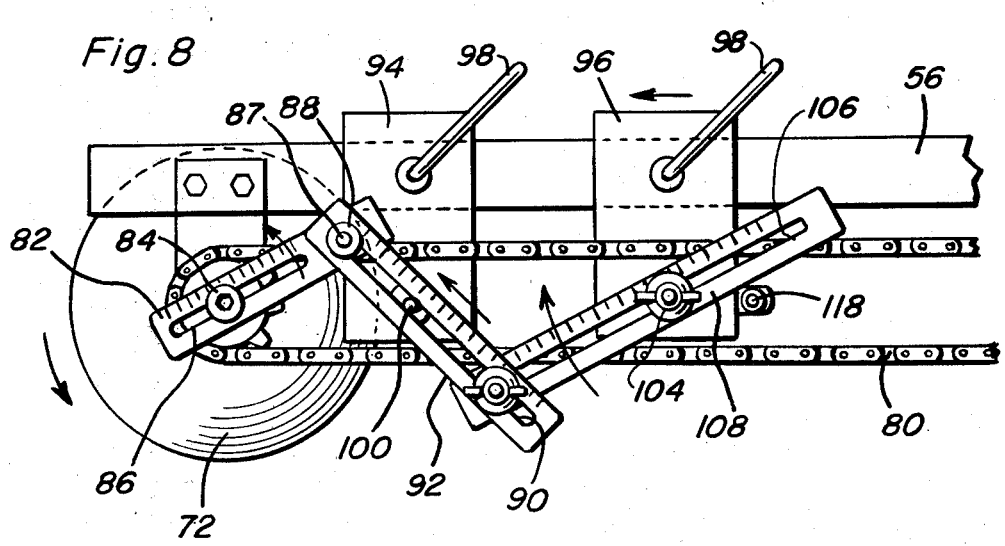

APPARATUS FOR CUTTING AND/OR SCRIBING CIRCLES AND OVALS

BACKGROUND OF THE INVENTION

There are many instances in which it is desirable to scribe ovals on or to cut ovals from sheet material and in a manner such that the size of the ovals as well as the length to width ratio thereof may be varied as desired. However, most oval scribing or cutting apparatuses are not constructed in a manner whereby precise and predetermined size and length to width ratio shaped ovals may be cut. Accordingly, a need exists for an oval scribing and cutting apparatus which may be variably preset to scribe or cut the desired oval.

Examples of previously known devices including some of the general structural and operational features of the instant invention are disposed in U.S. Pat. Nos. 1,058,537, 1,296,886, 1,474,868, 3,129,732 and 3,269,014.

BRIEF DESCRIPTION OF THE INVENTION

The oval cutting and/or scribing apparatus of the instant invention is constructed in a manner whereby ovals or different sizes and length to width ratios may be readily scribed or cut. The apparatus is further constructed in a manner whereby ovals of predetermined length and width may be accurately scribed or cut. In this manner, the production of specific sizes and shapes of ovals may be cut or scribed on a production basis.

The main object of this invention is to provide an apparatus which will be capable of scribing or cutting ovals of different sizes.

Anoter object of this invention is to provide an oval scribing and cutting apparatus which may be utilized to form ovals having different length to width ratios.

Another object of this invention is to provide an apparatus capable of scribing or cutting circles and eccentric circles of various sizes.

Yet another important object of this invention is to provide an apparatus in accordance with the preceding objects and adapted for production usage.

A final object of this invention to be specifically enumerated herein is to provide an oval scribing and cutting apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged fragmentary vertical sectional view taken substantially upon the plane indicated by the section line 3—3 of FIG. 1;

FIG. 4 is an enlarged fragmentary top plan view of the scribe or cutter actuating structure of the invention;

FIG. 5 is an enlarged fragmentary vertical sectional view taken substantially upon the plane indicated by the section line 5—5 of FIG. 4;

FIG. 6 is an enlarged fragmentary vertical sectional view taken substantially upon the plane indicated by the section line 6—6 of FIG. 3;

FIG. 7 is a side elevational view of the scribe or cutter support and the adjacent mounting arm portion from which the support is mounted; and FIG. 8 is a fragmentary elevational view similar to FIG. 4.

DETAILED DESCRIPTION OF THE INVENTION

Figure 1:
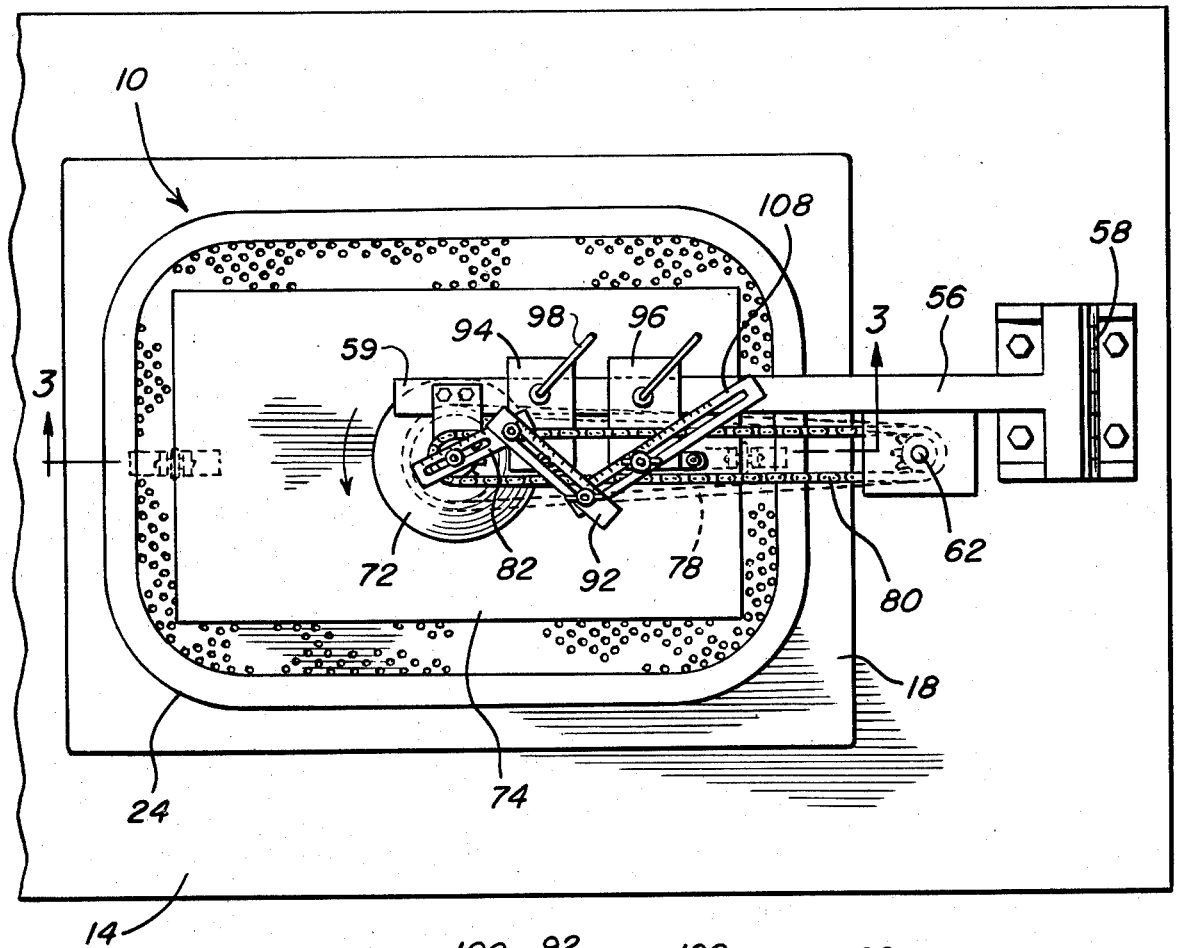
FIG. 1 is a fragmentary top plan view of the oval cutting and scribing apparatus of the instant invention.

Referring now more specifically to the drawings, the numeral 10 generally designates the oval cutting and scribing apparatus of the instant invention. The apparatus 10 includes a support table referred to in general by the reference numeral 12 including a tabletop 14 and depending legs 16. A support 18 is mounted on the tabletop 14 in spaced relation above the latter through the utilization of mounting spacers 20 and the support 18 includes a bearing sleeve 22 secured therethrough.

A rotary table 24 includes dependingly supported support wheels 26 rolling engaged with the upper surface of the support 18 and the rotary table 24 defines an upwardly opening central cavity 28 therein whose upper end is closed by a foraminated panel 30 whose upper surface is coplanar with the upper surface of the table 24. The central portion of the table 24 includes an outlet opening 32 with which the upper end of a tubular sleeve 34 is sealingly connected and the sleeve 34 extends downwardly and is rotatably received through the bearing sleeve 22. The lower end portion of the sleeve 34 has a sprocket wheel 36 mounted thereon and includes a lower terminal portion which extends downwardly through and is journalled from the tabletop 14. The lower terminal portion has a pulley wheel 38 mounted thereon and the inlet end of a vacuum line 40 is operatively connected to the lower end of the sleeve 34 through the utilization of a rotary coupling member 42.

The underside of the tabletop 14 dependingly supports a motor mount 44 from which a motor 46 is supported and the motor 46 includes an output shaft having a drive pulley 48 mounted thereon. The pulley 48 is aligned with the pulley 38 and drivingly connected thereto through the utilization of an endless belt 50.

Figure 2:
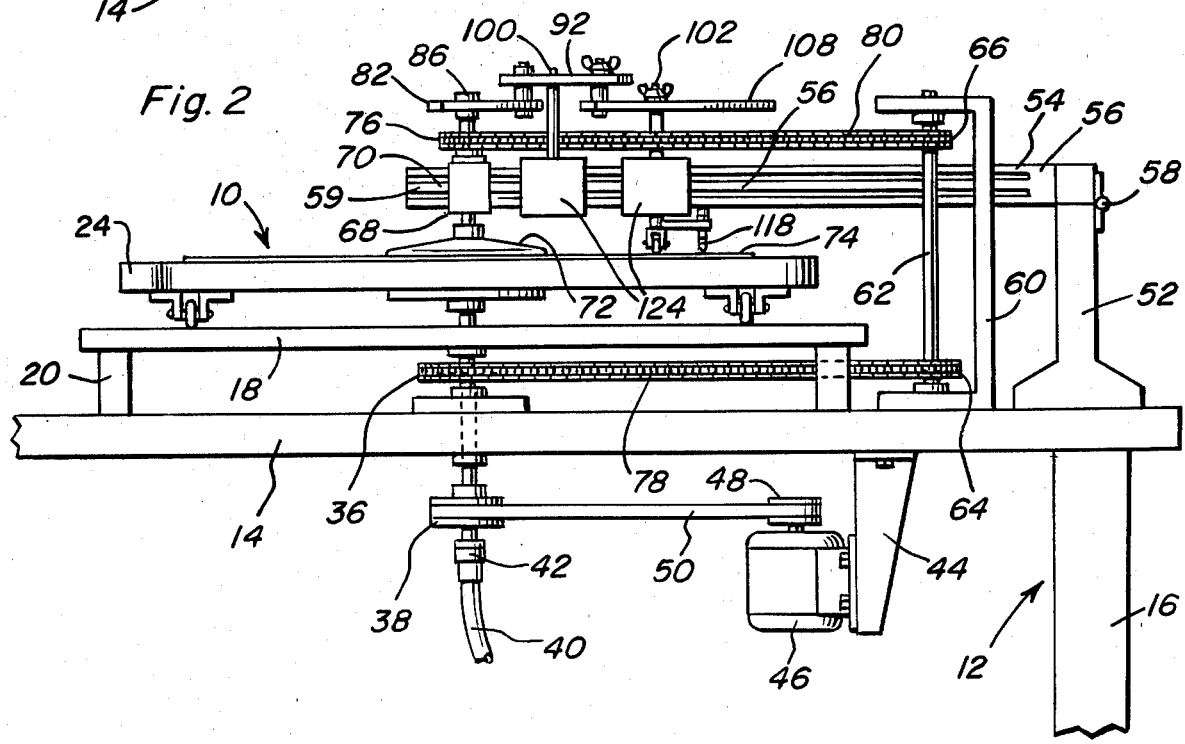
FIG. 2 is a side elevational view of the assemblage illustrated in FIG. 1.

An upright mount 52 is supported from one peripheral portion of the tabletop 14 and has the base end 54 of a mounting arm 56 pivotally supported therefrom as at 58. It will be noted that the arm 56 may be swung upwardly at its free end 59 from the lower horizontal position thereof illustrated in FIG. 2.

The tabletop 14 has a second upright mount 60 supported therefrom which journals an upstanding shaft 62 therefrom. The lower end of the shaft 62 has a sprocket wheel 64 mounted thereon aligned with the sprocket wheel 36 and the upper end of the shaft 62 has an upper sprocket wheel 66 mounted thereon. A shaft 68 is journalled from a support 70 carried by the free end 59 of the arm 56 and includes a lower end suction cup structure 72 journalled therefrom for overlying a sheet material workpiece 74 supported on a foraminated panel 30. The shaft 68 includes a sprocket wheel 76 aligned with the sprocket wheel 66 and an endless chain 78 drivingly connects the sprocket wheel 36 to the sprocket wheel 64 while an endless chain 80 drivingly connects the sprocket wheel 66 with the sprocket wheel 76. It is to be noted, however, that while the sprocket wheel 64, 66 and 76 are of the same size, the sprocket wheel 36 has a circumference equal to twice the circumference of each of the sprocket wheels 64, 66 and 76.

The upper end of the shaft 68 has a longitudinally slotted crank arm 82 supported therefrom through the utilization of a clamp-type fastener 84 received through a longitudinal slot 86 formed in the crank arm 82. One end of the crank arm 82 has a pivot fastener 87 supported therefrom and rotatably received in a clamp-type slide 88 adjustably positioned along a longitudinal slot 90 formed in a connecting link 92. A pair of support blocks 94 and 96 are mounted on the arm 56 for free sliding movement therealong and each of the support blocks includes a clamp screw 98 whereby it may be releasably secured in adjusted position along the arm 56. The block 94 includes a upstanding pin 100 slidingly and rotatably received in the slot 90 and the support block 96 includes an upstanding support shank 102 rotatably received through a clamp-type slide 104 slidingly received in a longitudinal slot 106 formed in a second connecting link 108. The connecting links 92 and 108 include overlapped end portions operably connected through the utilization of a pivot fastener 110 rotatably received through a clamp-type slide 112 shiftable along the slot 90. The lower end of the shank 102 includes a caster wheel assembly 114 rotatably supported therefrom and including a support arm 116 from which a scribe element 118 is supported in laterally spaced relation relative to the wheel of the caster wheel assembly 114. The scribe element 118 may comprise a marking element or a cutting blade.

The support block 96 actually comprises a follower mounted on the arm 56 for guided movement therealong and the follower 96 includes a plurality of outstanding mounting lugs 120 from which set screws 122 are supported. The set screws 122 are utilized to releasably secure the support body 124 from which the shank 102 is supported from the block or follower 96. Also, it will be noted that the pin 100 is supported from a body 126 similar to the body 124 and releasably supported from the slide block 94.

The clamp-type slide 112 and the pivot fastener 110 utilized to relatively pivotally connect the overlapped ends of the connecting links 92 and 108 may be of any suitable type wherein relative angular displacement between the links 92 and 108 is possible and wherein the clamp-type slide 112 may be tightened sufficiently to substantially rigidify the links 92 and 108 thereby establishing a substantially rigid arm extending between the pivot shaft 102 and pivot fastener 86.

In operation, if the links 92 and 108 are rigidly interconnected, the spacing of the pivot fastener 86 from the fastener 84 will define the effective lever arm and one-half the difference between the major and minor axes of the oval to be scribed on or cut out of the work sheet 74 disposed on the panel 30. Of course, the work sheet 74 is securely positioned on the panel 30 by vacuum. In the drawings, the work sheet 74 has been illustrated as smaller in plan shape than the panel 30. If it is desired, a suitable cover sheet having an opening formed therein corresponding to the plan size shape of the work sheet 74 may be disposed on the rotary table 124 in order to close the openings formed through the panel 30 outwardly of the outer marginal area of the work sheet 74.

If the pivot connected defined between the overlapped ends of the connecting links 92 and 108 is such to allow relative angular displacement between the links 92 and 108, a different shaped oval will be formed inasmuch as the link 92 will pivot about the pin 100 and also slide relative thereto. Of course, the clamp screws 98 of slide blocks 94 and 96 are to be loosened whenever an oval is being cut. On the other hand, when a circle is to be cut, the pivot connection at 102 may be totally loosened so as to allow the link 108 to slide relative to the pivot connection 102 and the clamp screw 98 of the slide block 96 is tightened. Further, the fastener 84 may be loosened whereby rotation of the sprocket wheel 76 will not effect angular displacement of the crank arm 82. In this manner, as the rotary table 24 is turned, the scribe element 118 will scribe a circle. The lower end of the shaft 70 rotatably supports the structure 72 therefrom, thereby allowing the sprocket wheel 76 to rotate at a speed twice the speed of rotation of the member 72, the latter rotating with the table 24.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for scribing circles and ovals of different width-to-length ratios, said apparatus including a table mounted for rotation about a first predetermined upright axis, a mounting arm supported above said table, generally paralleling the latter and extending along a path paralleling a radius of the axis of rotation of said table, an upright shaft journalled from said mounting arm for rotation about a second upright axis, means drivingly connecting said table and shaft for rotation of said shaft at twice the speed of rotation of said table, a support mounted on said mounting arm for guided movement therealong, a scribe tool carried by said support for engagement with and scribing a workpiece disposed on said table for rotation therewith, and motion converting and drive means operatively connected between said upright shaft and support for effecting oscillation of said support along said arm responsive to and in timed relation with rotation of said shaft.

2. The combination of claim 1 wherein said motion converting and drive means includes means operative to continuously vary the linear displacement rate of said support along said arm during constant angular velocity, said upright shaft.

3. The combination of claim 2 wherein said motion converting and drive means includes means operative to selectively vary the linear displacement rate of said support along said arm during a predetermined arc of angular displacement of said upright shaft.

4. The combination of claim 1 wherein said table includes a foraminated top surface beneath which a source of vacuum is communicated.

5. The combination of claim 1 wherein the lower end of said upright shaft includes hold down structure journalled therefrom for downward displacement upon and operative to maintain a workpiece in stationary position on said table.

6. The combination of claim 5 wherein said table includes a foraminated top surface beneath which a source of vacuum is communicated.

7. The combination of claim 6 wherein said motion converting and drive means includes means operative to selectively vary the linear displacement rate of said support along said arm during a predetermined arc of angular displacement of said upright shaft.

8. The combination of claim 1 wherein said apparatus includes a stationary support member disposed to one side of said table, said arm having one end thereof pivotally mounted from said support member, said upright shaft being journalled from the other end of said arm.

9. The combination of claim 1 wherein said motion converting and drive means includes an adjustable length crank arm carried by said shaft and first and second adjustable length connecting links, said first and second adjustable length connecting links having one pair of corresponding ends pivotally connected together, the other end of one of said connecting links being pivotally anchored relative to said support and the other end of the other connecting link being pivotally anchored relative to said crank arm, the midportion of said other connecting link being longitudinally slotted, said arm including a guide pin structure mounted thereon for free sliding movement longitudinally therealong with said guide pin structure being sliding and rotatably received in said slot.

* * * * *